(12) United States Patent
Drobe (10) Patent No.: US 7,976,158 B2
(45) Date of Patent: Jul. 12, 2011

(54) OPHTHALMIC EYEGLASS CORRECTING BOTH FOVEAL VISION AND PERIPHERAL VISION

(75) Inventor: Björn Drobe, Charenton-le-Pont (FR)

(73) Assignee: Essilor International (Compagnie Generale d'Optique), Charenton le Pont (FR)

( * ) Notice: Subject to any disclaimer, the term of this patent is extended or adjusted under 35 U.S.C. 154(b) by 0 days.

(21) Appl. No.: 12/573,823

(22) Filed: Oct. 5, 2009

(65) Prior Publication Data

US 2010/0085536 A1 Apr. 8, 2010

(30) Foreign Application Priority Data

Oct. 7, 2008 (FR) ...................................... 08 56801

(51) Int. Cl.
*G02C 7/06* (2006.01)
(52) U.S. Cl. .................. 351/169; 351/168; 351/177
(58) Field of Classification Search .......... 351/168–172, 351/177
See application file for complete search history.

(56) References Cited

U.S. PATENT DOCUMENTS

| 1,955,047 | A | 4/1934 | Beach |
| 2005/0105047 | A1 | 5/2005 | Smith, III et al. |
| 2007/0109494 | A1 | 5/2007 | Dreher |
| 2007/0115431 | A1 | 5/2007 | Smith, III et al. |
| 2007/0159601 | A1 | 7/2007 | Ho et al. |
| 2009/0257026 | A1* | 10/2009 | Varnas et al. .................. 351/209 |
| 2010/0002191 | A1 | 1/2010 | Drobe |

FOREIGN PATENT DOCUMENTS

| EP | 0 367 878 | 5/1990 |
| EP | 0 445 994 | 9/1991 |
| EP | 1 703 313 | 9/2006 |
| WO | WO 03/054616 | 7/2003 |
| WO | WO 2007/041796 | 4/2007 |
| WO | WO 2007/082268 | 7/2007 |
| WO | WO 2008/104695 | 9/2008 |

OTHER PUBLICATIONS

Cheng A. C. et al., "Assessment of pupil size under different light intensities using the Procyon pupillometer", Journal Cataract and Refractive Surgery, vol. 32, No. 6, 2006, pp. 1015-1017.
Schuldt, S., "ysis—Natürliches Sehen erleben", Deutsche Optiker Zeitung, XX, DE, No. 5/2004, pp. 38-43.
Tse, Dennis et al., "Simultaneous Defocus Integration during Refractive Development", IOVS, vol. 48, No. 12 2007, 5352-5359.

* cited by examiner

*Primary Examiner* — Scott J Sugarman
(74) *Attorney, Agent, or Firm* — Cohen Pontani Lieberman & Pavane LLP (57) ABSTRACT

An ophthalmic eyeglass (1) is adapted for correcting both the foveal vision and the peripheral vision of a wearer. An image portion formed in the foveal zone of the wearer's retina is thus sharp, at the same time as another image portion is also sharp, which is formed on the retina away from the foveal zone, by light rays that are oblique to the line of sight of the wearer. To this purpose, the eyeglass comprises a central zone (10) and first (21) and second (22) regions that alternate in a peripheral zone (20) of said eyeglass. First parameters of the eyeglass in the central zone and in the first regions are adapted so as to correct the foveal vision of the wearer and second parameters of the eyeglass in the second regions are adapted for correcting the peripheral vision of said wearer.

38 Claims, 7 Drawing Sheets

OPHTHALMIC EYEGLASS CORRECTING BOTH FOVEAL VISION AND PERIPHERAL VISION

RELATED APPLICATION

This application claims the priority of French application Ser. No. 08/56801 filed Oct. 7, 2008, the entire content of which is hereby incorporated by reference.

FIELD OF THE INVENTION

The present invention relates to a method of producing an ophthalmic eyeglass that corrects both foveal vision and peripheral vision.

It also relates to an ophthalmic lens which may constitute a semi-finished eyeglass, from which such a finished eyeglass can be produced, or which constitutes itself the finished eyeglass.

BACKGROUND OF THE INVENTION

Foveal vision corresponds to viewing conditions for which the image of an object looked at is formed by the eye in the central zone of the retina, called the foveal zone.

Peripheral vision corresponds to the perception of elements of a scene that are offset laterally relative to the object looked at, the images of said elements being formed on the peripheral portion of the retina, away from the foveal zone.

Firstly, the ophthalmic correction with which an ametropic subject is provided is adapted for his foveal vision. However, as is known, the correction has to be reduced for the peripheral vision relative to the correction that is determined for the foveal vision. In particular, studies carried out on monkeys have shown that strong defocusing of the light behind the retina, which occurs away from the foveal zone, may cause the eye to extend and therefore may cause a myopia defect to increase. Spectacle eyeglasses have therefore been proposed, for example such as those described in the document WO 2007/041796, which comprise a central zone dedicated to the correction of the foveal vision and a peripheral zone dedicated to the peripheral vision. Thus, two separate ophthalmic correction values may be obtained, which are adapted for the foveal vision and for the peripheral vision respectively. However, such lenses do not provide an appropriate correction when the wearer looks at an object by rotating his eyes. This is because he then uses his foveal vision through a lateral zone of the lens which was adapted for his peripheral vision.

Document EP 0 367 878 describes an eyeglass having concentric zones that has several focal lengths at any point on its surface. Such an eyeglass may provide two ophthalmic correction values simultaneously, for example one for the foveal vision and the other for the peripheral vision, irrespective of the direction of viewing through the eyeglass. However, because some of the optical power is provided by a light diffraction effect, the eyeglass exhibits strong chromatism. The effective optical power of the eyeglass cannot therefore be precisely matched for all colours relative to the sphere error determined for an ametropic person.

SUMMARY OF THE INVENTION

An object of the present invention is therefore to provide a new ophthalmic eyeglass that will procure, for a future wearer, corrections adapted for his foveal vision and for his peripheral vision, without having the drawbacks of the prior eyeglasses.

To this end, one aspect of the invention is directed to a method of producing an ophthalmic spectacle eyeglass intended for an identified wearer, comprising the following steps:

/1/ a first ophthalmic correction for the wearer's foveal vision and a second ophthalmic correction for at least one eccentricity value belonging to the wearer's peripheral vision are obtained, these first and second corrections being different;

/2/ a central zone and a peripheral zone of the eyeglass are determined, the peripheral zone being located between the central zone and at least one portion of a peripheral edge of the eyeglass;

/3/ the peripheral zone of the eyeglass is divided into a plurality of first and second regions that are contiguous and alternate with a pitch of less than 2 mm;

/4/ first parameters of the eyeglass in the central zone and in the first regions, corresponding to the first ophthalmic correction, are determined and second parameters of the eyeglass in the second regions are determined according to the second ophthalmic correction; and /5/ the eyeglass is produced in accordance with these first and second parameters.

Thus, an eyeglass according to an embodiment of the invention has a central zone that produces a correction adapted to the foveal vision. The foveal vision of the wearer is therefore corrected optimally when the wearer's line of sight passes through this central zone, especially close to the centre thereof.

The eyeglass also has a peripheral zone, a portion of which—called the first regions—is also dedicated to the correction for the foveal vision, like the central zone. A complementary portion of these first regions in the peripheral zone—called the second regions—is also dedicated to the correction for the peripheral vision. Such an allocation of the first and second regions, separately and respectively to the correction for the foveal vision and the correction for the peripheral vision, does not result from a diffractive effect, so that the eyeglass does not exhibit strong chromatism. For example, the parameters of the eyeglass that are determined and then applied in the first and second regions may comprise an average curvature of a surface of the eyeglass and/or a light refractive index of a material of the eyeglass.

Furthermore, given that the first and second regions alternate with a pitch of less than 2 mm (millimetres), the two corrections are available simultaneously in the peripheral zone. This is because the alternating pitch of the first and second regions is then smaller than the diameter of the wearer's pupil. Thus, when the wearer's line of sight passes through the peripheral zone of the eyeglass, the first correction occurs for first light rays that pass through the eyeglass in a first region and participate in forming a central portion of the image on the wearer's pupil in the foveal zone. At the same time, the second correction occurs for second light rays that pass through the eyeglass in a second region and participate in forming a peripheral portion of the same image on the wearer's pupil away from the foveal zone. The wearer therefore perceives a sharp image even when he is looking obliquely through the eyeglass.

The peripheral zone of the eyeglass may surround the central zone, or else extend only over one or more sides thereof.

Moreover, the alternating pitch of the first and second regions in the peripheral zone may be constant or variable.

Preferably, the central zone and the first and second regions are determined by variations in at least one parameter of one and same first surface of the ophthalmic eyeglass. A second surface of the eyeglass may then be modified subsequently so as to adapt the eyeglass to the first ophthalmic correction for the wearer. In this way, identical semi-finished eyeglasses that determine the central zone and the first and second regions may be used for wearers having different first ophthalmic corrections. The parameter variations between the central zone and the first regions on the one hand, and the second regions on the other, may form discontinuities on the surface itself. This may result in an eyeglass which is thinner and lighter. This first surface may be the convex anterior surface of the eyeglass, or its concave posterior surface. It may also be an intermediate surface between the anterior and posterior surfaces of the eyeglass, which separates two transparent media having different values of a light refractive index.

According to a first refinement of the invention, step /2/ may comprise the following substeps:

/2-1/ an amplitude of head movement by the wearer, performed when said wearer looks in succession at objects located in different directions, is characterized; and /2-2/ a size of the central zone of the eyeglass is determined so that this central zone size decreases as a function of the head movement amplitude which has been characterized for the wearer.

In this way, the second regions of the eyeglass, in which the ophthalmic correction is adapted for the wearer's peripheral vision, may be arranged closer to the centre of the eyeglass for a wearer who mainly rotates his head when changing line of sight. Conversely, the central zone may be larger for a wearer who rotates his eyes rather than his head. The peripheral vision may thus be appropriately corrected for small eccentricity values without inconveniencing the wearer in respect of his propensity to rotate his head or his eyes when looking in different directions.

Preferably, the central zone of the eyeglass, in which the parameters correspond to the first ophthalmic correction, may be contained in a disc of 7.5 mm radius. Thus, the peripheral vision of the wearer may be appropriately corrected for eccentricity values from about 30° (degrees) upwards.

According to a second refinement of the invention, a proportion between the first and second regions in the peripheral zone may be determined in step /3/ as a function of the amplitude of head movement performed by the wearer when said wearer looks in succession at objects located in different directions. It is determined so that a quotient of a sum of areas of second regions divided by an area of a corresponding portion of the peripheral zone increases as a function of the amplitude of head movement performed by the wearer.

To implement these refinements, the amplitude of the head movement performed by the wearer may be characterized by carrying out the following steps:

an angle of head rotation by the wearer, when said wearer looks in succession at two objects located in angularly separated directions, is measured; and the value of a gain is determined from a quotient between the measured angle of rotation of the wearer's head on the one hand and an angular distance between the two objects on the other, this gain varying as an increasing function or as a decreasing function of the quotient.

In general, an ophthalmic eyeglass according to the invention is adapted for producing a myopia correction or a hypermetropia correction for the wearer.

Another aspect of the invention is directed to a lens for ophthalmic spectacles, which comprises:

a central zone;

a peripheral zone located between the central zone and at least one portion of a peripheral edge of the lens; and first and second regions, which form a partition of the peripheral zone, and which are contiguous and alternate with a pitch of less than 2 mm, The lens is adapted so that a spectacle eyeglass obtained therefrom produces a first ophthalmic correction, for a foveal vision in the central zone and in the first regions, and produces a second ophthalmic correction, for a peripheral vision in the second regions which is different from the first ophthalmic correction. Thus, the second regions produce a second optical power that differs from a first optical power produced in the first regions and in the central zone.

Such a lens may be produced using a method as described above.

Optionally, the invention may be applied to the production of a progressive lens, also called a progressive addition lens. In this case, the lens may have two faces that are opposed and separated by a refringent medium. One of these two faces determines the central zone and the first and second regions in accordance with the invention, while the other face has a continuous surface with a progressive variation in curvature.

BRIEF DESCRIPTION OF THE DRAWINGS

Other features and advantages of the present invention will become apparent in the following description of non-limiting examples of its implementation, with reference to the appended drawings in which.

DETAILED DESCRIPTION OF THE DRAWINGS

For the sake of clarity, the dimensions appearing in FIGS. 1a, 1b, 2a, 2b, 10a and 10b do not correspond to actual dimensions or to ratios of actual dimensions. Furthermore, identical references indicated on different figures have identical meanings.

Figure 1A:
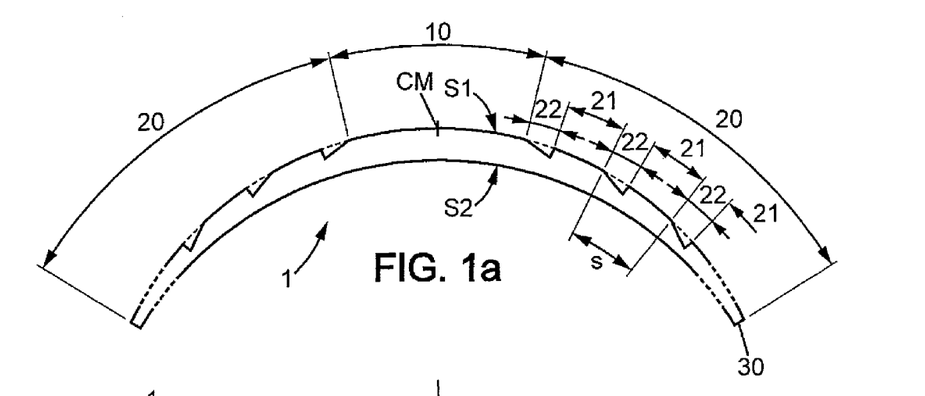
FIGS. 1a and 1b are two views of a first lens according to the invention, in cross-section and in plan respectively.
Figure 1B:
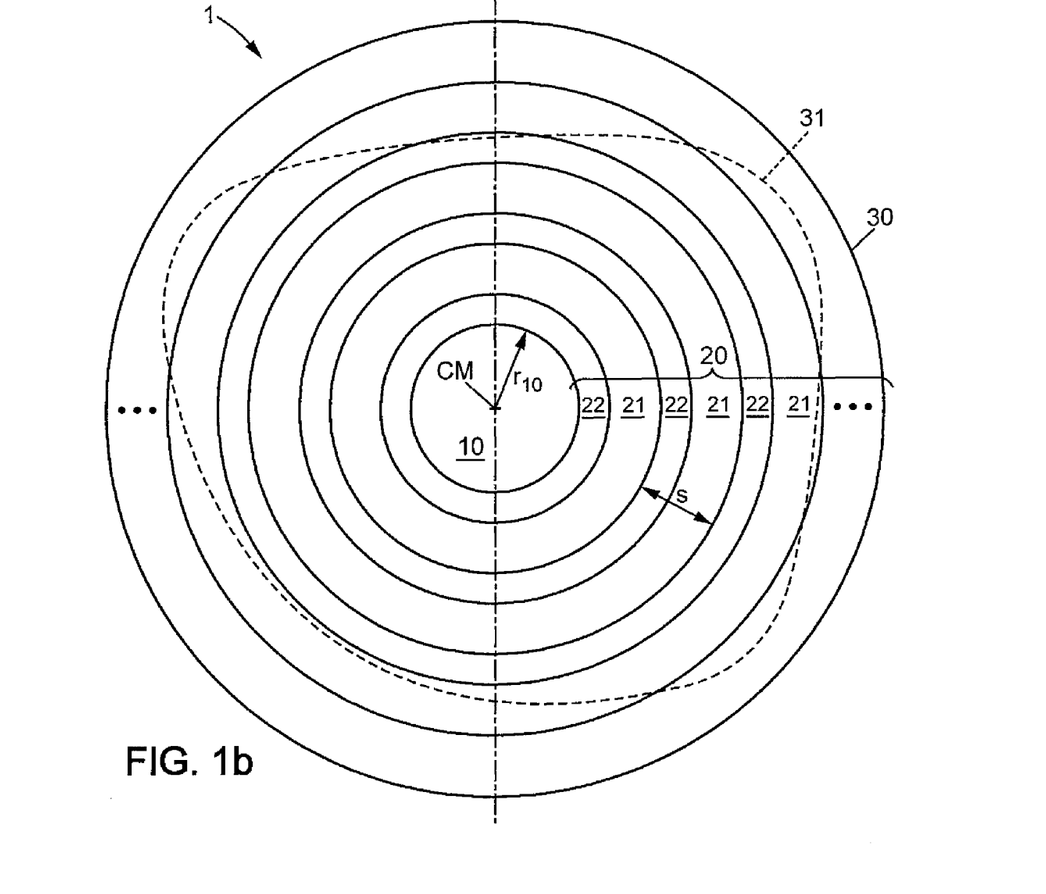

As shown in FIGS. 1a and 1b, an ophthalmic lens 1 has an anterior face S1 and a posterior face S2. The anterior and posterior faces S1 and S2 are thus designated relative to the position in which the lens 1 is used by a person wearing it. The lens 1 may form a semi-finished or finished eyeglass. The term "semi-finished eyeglass" is understood to mean a spectacle eyeglass blank, of which only one of the anterior and posterior faces possesses a definitive shape. The other face is then machined subsequently, especially to give the finished eyeglass optical power values that correspond to the ametropia that was determined for the future wearer of the eyeglass. When the lens 1 is a semi-finished eyeglass, it possesses an initial peripheral edge 30 that may be circular, for example with a diameter of 60 mm. When it is a finished eyeglass, with its two faces S1 and S2 that are definitive, its peripheral edge may still be that of the semi-finished eyeglass. This edge may also have been trimmed to the dimensions of an ophthalmic spectacle frame housing into which the eyeglass is intended to be fitted. The contour 31 in FIG. 1b shows the edge of such a finished eyeglass after trimming.

The lens 1 is divided into several zones parallel to one of the faces S1 or S2. Among these zones, a central zone 10 may be centred, for example with respect to a fitting cross FC of the lens 1. This fitting cross FC is used for positioning the lens 1 with respect to the spectacle frame housing. A peripheral zone 20 extends between the central zone 10 and the peripheral edge 30 or 31 of the lens 1. The zone 20 may extend all around the zone 10 or in a limited angular sector around the latter.

The central zone 10 is preferably contained in a disc of 7.5 mm radius. In this way, the peripheral zone 20 has an area sufficient to implement the invention, even when the housing for the eyeglass in the frame is small.

Also preferably, the central zone 10 may contain a disc of 2 mm radius. A significant proportion of the light rays that form an image in the foveal zone of the wearer's retina then passes through the zone 10 when his line of sight passes through or is close to the centre of the zone 10.

The peripheral zone 20 is divided into first and second contiguous regions that are referenced as 21 and 22 respectively. The regions 21 and 22 alternate and are dedicated to obtaining two respective ophthalmic corrections for the wearer of the finished eyeglass produced from the lens 1. Thus, the regions 21 are dedicated to obtaining a first ametropia correction and the regions 22 are dedicated to obtaining a second ametropia correction that differs from the first correction. Furthermore, the first ametropia correction provided by the regions 21 is identical to that produced in the central zone 10.

According to the invention, the first ophthalmic correction is determined for correcting the foveal vision of the wearer of the finished eyeglass produced from the lens 1 and the second ophthalmic correction is determined for correcting the peripheral vision of this wearer, for at least one direction of light rays passing through his pupil obliquely relative to the direction in which he is looking. These two ophthalmic corrections differ from each other.

The first ophthalmic correction, for the foveal vision, may be determined for the wearer in one of the usual ways. Also known is one way of obtaining an ametropia correction adapted to his peripheral vision, which correction may be determined by performing a measurement on the wearer. Such a measurement may in particular be an autorefractometer or skiascopy measurement carried out off the eye's optical axis.

Optionally, when the first correction produced by the central zone 10 and the first regions 21 of the eyeglass is a myopia correction for the foveal vision of the wearer, the second correction may correspond to a myopia subcorrection for his peripheral vision. Such a subcorrection may prevent the degree of myopia of the eyeglass wearer increasing in the long term, while still maintaining a correction for the foveal vision that affords him maximum acuity. Likewise, when the first correction is a hypermetropia correction for the foveal vision, the second correction may correspond to a hypermetropia subcorrection for the peripheral vision.

Alternatively, the ametropia correction, for the peripheral vision of the wearer and for a fixed eccentricity, may be determined by adding a constant value to the ametropia correction value determined for foveal vision of this wearer. For a myopia correction, this constant value may be +0.8 dioptres for a 30° eccentricity, which corresponds to an average difference between the degree of myopia of a person in foveal vision and his degree of myopia in peripheral vision. In the present invention, the eccentricity denotes the angle between the direction of an oblique light ray entering the eye of the wearer and his line of sight through the eyeglass. Considering, for correcting the peripheral vision, that the line of sight remains coincident with a reference direction that passes through a fixed point on the eyeglass, the eccentricity of the light ray may be identified by the distance on the eyeglass between the point through which the ray passes and the fixed point. This fixed point may be the fitting cross FC printed on the eyeglass and corresponding in general to the straight line of sight for the wearer. Therefore, the eccentricity of the direction of the light ray may be identified by the radial distance on the eyeglass between the fitting cross FC and the point on the anterior surface S1 of the eyeglass through which this line of sight passes. The eccentricity is denoted hereafter by E.

In an eyeglass according to the invention, the first regions 21 and the central zone 10 are produced in accordance with a first set of parameters corresponding to the first ametropia correction and the second regions 22 are produced in accordance with a second set of parameters corresponding to the second ametropia correction. For example, the first and second parameters may be curvatures of a face of the lens 1, for example the face S1, in the corresponding regions or zones. In this case, the face S1 has discontinuities in curvature between two regions 21 and 22 that are contiguous and also between the central zone 10 and that region 22 which is contiguous with said central zone. Optionally, these discontinuities in curvature may be superposed on discontinuities in sagittal height, perpendicular to the face S1 (FIG. 1a).

The finished eyeglass therefore has a first optical power which is the same in the central zone 10 and in the first regions 21, and a second optical power in each of the second regions 22. The first optical power in the zone 10 and regions 21 is denoted by $P_1$. Given that the optical power $P_1$ relates to the foveal vision, it is determined for light rays that come from the object looked at and pass through the centre of rotation of the wearer's eye after having passed through the spectacle eyeglass.

The second optical power of the finished eyeglass in the second regions 22 is denoted by $P_2$. Given that the optical power $P_2$ relates to the peripheral vision, it is dedicated to light rays that are different from those with which the optical power $P_1$ is involved. For this reason, the optical power $P_2$ is determined on the basis of light rays that come from the object looked at and pass through the wearer's pupil after having passed through the spectacle eyeglass. More precisely, a light ray that participates in peripheral vision passes through the nodal points of the wearer's eye, being oblique to the eye's axis.

The optical power $P_2$, within any one of the regions 22, may or may not be the same sign—positive for a hypermetropia correction and negative for a myopia correction—as the optical power $P_1$ in the zone 10 and in the regions 21.

When the first ophthalmic correction produced by the eyeglass in the central zone 10 and the first regions 21 is a hypermetropia correction, the optical power $P_2$ within any one of the second regions 22 is preferably lower in algebraic value than the optical power $P_1$. The optical power $P_2$ may also be constant or may decrease in algebraic value as a function of the radial distance measured on the eyeglass from a reference point of the zone 10.

Conversely, when the first ophthalmic correction is a myopia correction, the optical power $P_2$ within any one of the second regions 22 is preferably higher in algebraic value than the optical power $P_1$. The optical power $P_2$ may also be constant or may increase in algebraic value as a function of the radial distance.

Such zero or monotonic variations in the optical power $P_2$ occur from one region 22 to another, and optionally within each region 22. In this way, several peripheral vision corrections may be obtained, each being adapted for a different value of the eccentricity E.

According to a first option, the value of the optical power $P_2$ within the second regions 22 may be the same throughout the peripheral zone 20.

Figure 3:
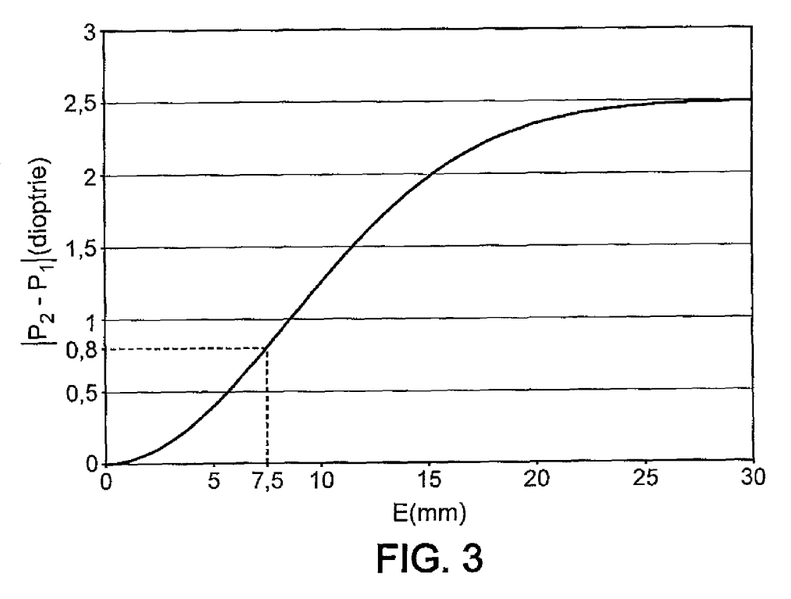
FIG. 3 is a plot showing variations in peripheral vision correction for an eyeglass according to the invention.

According to a second option, the absolute difference $|P_2-P_1|$ between the value of the optical power $P_2$ in the regions 22 on the one hand and the common value of the optical power $P_1$ in the zone 10 and the regions 21 on the other may increase progressively as a function of the eccentricity E. The plot in FIG. 3 shows such a variation, having a value of 0.8 dioptres for an eccentricity of 7.5 mm, corresponding to an angle of incidence of 30° for light rays participating in the peripheral vision. This plot indicates values of the difference $|P_2-P_1|$ for all values of the eccentricity E so as to be able to be used irrespective of the positions and the widths of the regions 22. However, it should be understood that, for a lens according to the invention, only disjoint segments of the curve in FIG. 3 that are away from the origin correspond to the regions 22.

Again, according to a third option, the optical power $P_2$ may be constant within each region 22, whereas the absolute difference $|P_2-P_1|$ increases between two successive regions 22 on going towards the peripheral edge 30 or 31.

Advantageously, the second regions 22 each have at least one dimension lying between 15 μm (microns) and 1000 μm, preferably between 25 μm and 50 μm. Thus, the partition of the peripheral zone 20 between the regions 21 and 22 causes no significant diffraction, while remaining invisible or almost invisible to the naked eye. There is therefore no inconvenience to the wearer, and the aesthetic quality of the eyeglass remains compatible with the requirements in the ophthalmic field.

The alternating pitch of the regions 21 and 22 is the distance separating two regions 21 that are separated by a single region 22. The pitch is denoted by s in the figures. This pitch has local values in the peripheral zone 20. Within the zone 20 it may be constant or vary, while still remaining less than 2 mm. Moreover, in a preferred arrangement of the regions 21 and 22 in the peripheral zone 20, they may be strips that are arranged in the angular sector of the zone 20 around the zone 10. These strips of regions 21 and 22 may alternate along radial directions going from the zone 10 to the peripheral edge 30 or 31. In this case, the width of each strip of region 22 may be between 15 μm and 1000 μm, preferably between 25 μm and 50 μm, along the radial directions stemming from the fitting cross FC.

Figure 2A:
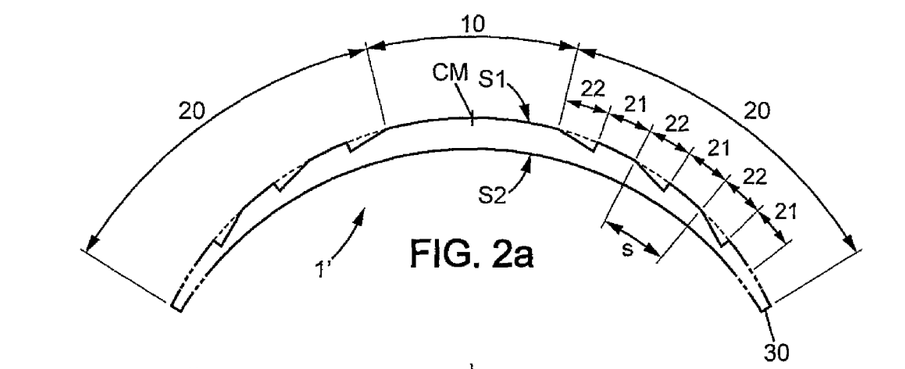
FIGS. 2a and 2b correspond to FIGS. 1a and 1b respectively, for a second lens according to the invention.
Figure 2B:
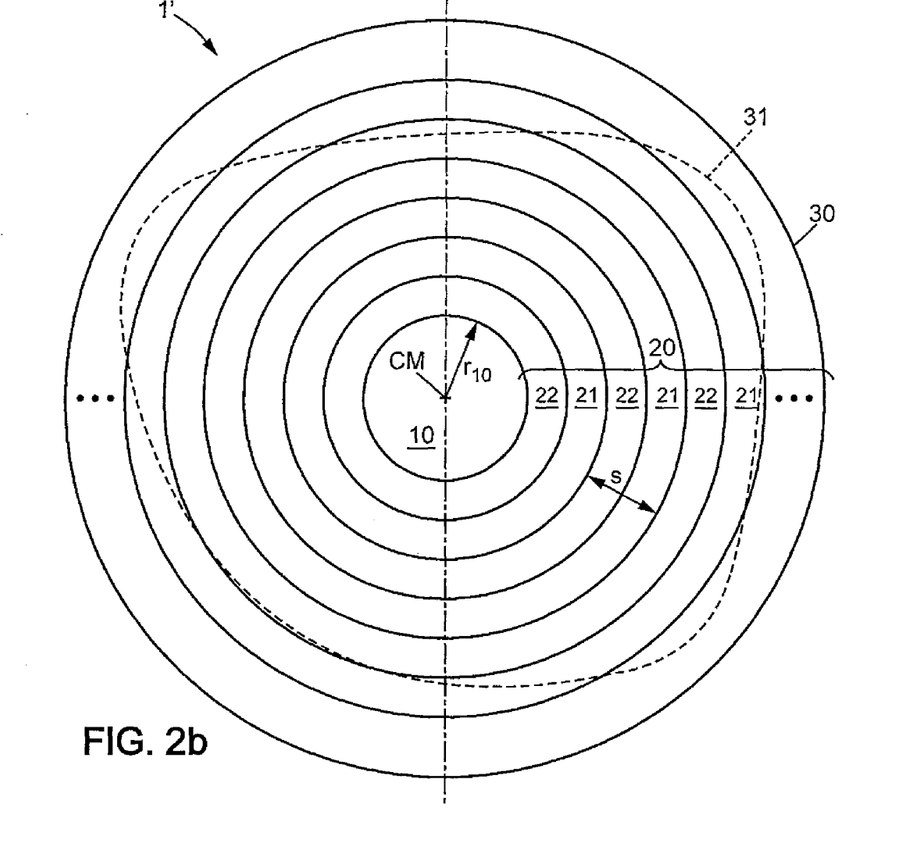

The lens shown in FIGS. 2a and 2b has the general reference 1'. The lenses 1 and 1' have respective central zones 10 of the same size. They are circular and centred on the fitting cross FC, with the same radius $r_{10}$. At the same time, the alternating pitch s of the regions 21 and 22 is the same for the lenses 1 and 1'. The lenses 1 and 1' differ by the values of the period ratio of the regions 21 and 22. In the present description, the phrase "period ratio" of the regions 21 and 22 is understood to mean the quotient of the width of the regions 22, i.e. along the direction of alternation with the regions 21, divided by the local value of the alternating pitch s. This period ratio may be constant or may vary in the peripheral zone 20.

According to two refinements of the invention, the size of the central zone 10 on the one hand, and the proportion between the regions 21 and the regions 22 on the other, may be adapted to the wearer of the eyeglass according to his propensity to rotate his eyes or his head more when he looks in succession at objects that are in two different directions. It should be understood that the size of the zone 10 and the proportion between the regions 21 and 22 may thus be adapted independently of each other. In particular, only the size of the zone 10 may be adapted to the wearer in this way, or else only the proportion between the regions 21 and 22.

Figure 4A:
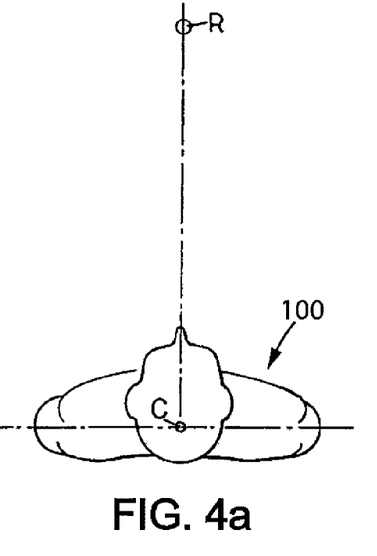
FIGS. 4a and 4b illustrate a principle of measuring eye and head movements by a person wearing spectacles.

For this purpose, relative amplitudes of eye and head movements performed by the wearer for whom the eyeglass is intended are firstly characterized. To this purpose, the wearer may be asked to look straight ahead at a first target, called a reference target, by facing the latter. The reference target is denoted by R in FIG. 4a and the reference 100 denotes the wearer. The reference target may in particular be located at the wearer's eye level. The wearer is therefore placed in front of the reference target R, with his shoulders located approximately in a vertical plane perpendicular to the virtual line joining his head to the reference target. His head and his eyes are therefore directed towards the reference target.

Starting from this situation, the wearer 100 is asked to look at a second target, called the test target and denoted by T, which is offset from the reference target R, without moving his shoulders. To do this, he partly rotates his head and partly rotates his eyes (FIG. 4b) in such a way that his line of sight moves from the reference target R to the test target T. Preferably, the test target T is offset horizontally relative to the reference target R so as to characterize the horizontal head and eye movements of the wearer.

Figure 4B:
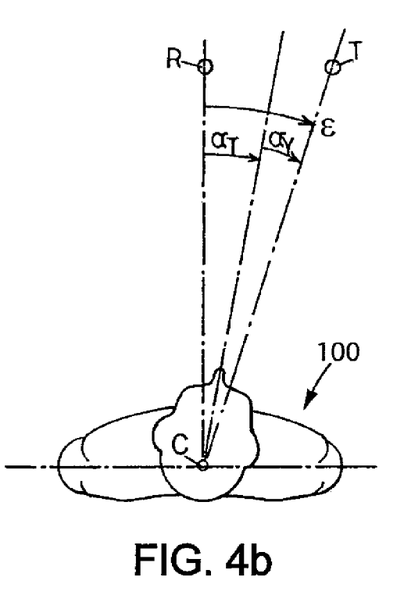

The angular distance between the test target T and the reference target R relative to the wearer 100 is denoted by $\epsilon$. The centre of rotation C of the head is taken as pole for measuring the angles in a horizontal plane containing this pole and the two targets R and T. In FIG. 4b, $\alpha_H$ denotes the angle of rotation of the head by the wearer 100, also called the angular deviation of the head, for passing from the first situation in which he is looking at the reference target R to the second situation in which he is looking at the test target T. The angle of rotation of the eyes performed at the same time by the wearer 100 is denoted by $a_E$. The angular distance $\epsilon$ is therefore equal to the sum of the two angles $\alpha_H$ and $\alpha_E$.

The quotient of the angular deviation $\alpha_H$ of the head divided by the angular distance $\epsilon$ is then calculated. This quotient is equal to unity for a wearer who has rotated just his head to pass from looking at the reference target R to looking at the test target T and equal to zero for a wearer who has rotated just his eyes.

Next, for this "eye/head" coordination test corresponding to the movements performed by the wearer 100, a gain G is calculated. The gain G may be defined by a predetermined function of the quotient of the angular deviation of the head $\alpha_H$ divided by the angular distance $\epsilon$. For example the gain G may be directly equal to the quotient of $\alpha_H$ divided by $\epsilon$: $G=\alpha_H/\epsilon$. A wearer who rotates essentially his eyes to fix on the test target (called an eye-mover) therefore has a G value close to zero, whereas a wearer who essentially rotates his head to fix on the same target (called a head-mover) has a G value close to unity.

This "eye/head" movement coordination test may be carried out on the wearer in the premises of a retail optician where he has ordered his pair of spectacles equipped with the eyeglass according to the invention. Other "eye/head" movement coordination tests equivalent to the one described above may alternatively be carried out, without the implementation of the invention being modified in its essentials.

Figure 5:
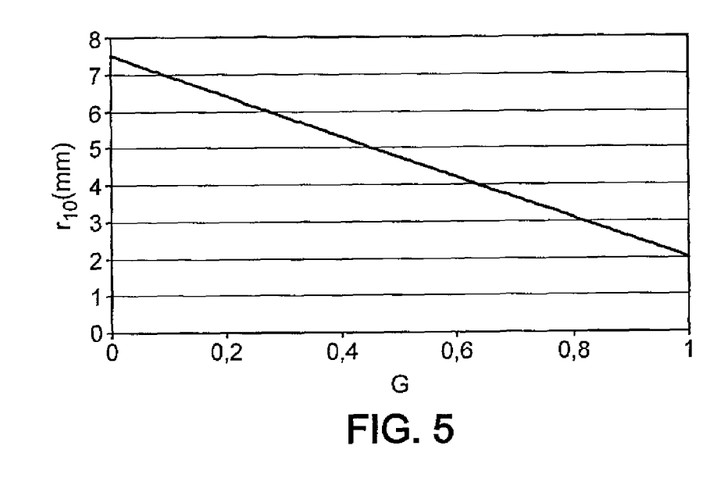
FIG. 5 is a plot showing variations in size of the central zone for an eyeglass according to the invention.

The plot in FIG. 5 is an example showing the variation in size of the central zone 10 as a function of the gain G. To give an example, the zone 10 still has a disc shape. The radius of this disc is denoted by $r_{10}$ and this is plotted on the y-axis. The possible values of the gain G are indicated on the x-axis. The variation in radius $r_{10}$ may be linear between a minimum value of 2 mm, which is ascribed when the gain G is equal to unity, and a maximum value of 7.5 mm, which is ascribed when the gain G is equal to zero. Thus, a size may be ascribed to the central zone 10, this being smaller the more the wearer moves his head when looking in succession in two different directions.

Figure 6:
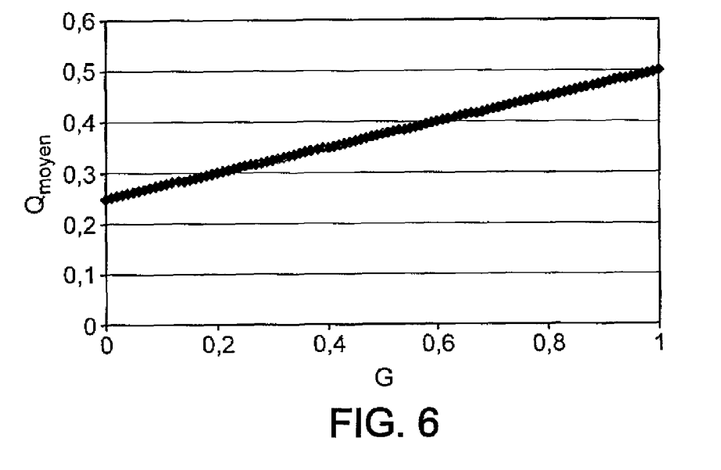
FIG. 6 is a plot showing variations in an average proportion of regions dedicated to the correction of peripheral vision.

The plot in FIG. 6 is an example of variation in overall proportion of the second regions 22 in the peripheral zone 20. This overall proportion is defined as the quotient of the sum of the areas of the regions 22 divided by the total area of the peripheral zone 20. It is denoted by $Q_{mean}$ and plotted on the y-axis. The values of the gain G are again plotted on the x-axis. The variation in the proportion $Q_{mean}$ may be linear between a minimum value of 0.25, which is ascribed when the gain G is equal to zero, and a maximum value of 0.5, which is ascribed when the gain G is equal to unity. Thus, a value may be ascribed to the overall proportion $Q_{mean}$ of the regions 22, which is higher the more the wearer moves his head when looking in succession in two different directions.

Several methods may be used for obtaining any value of the overall proportion $Q_{mean}$ of the regions 22 in the peripheral zone 20.

According to a first method, the strips of the regions 22 may have respective widths that are initially fixed throughout the peripheral zone 20 along the radial directions originating from the fitting cross FC. In this case, the proportion between the regions 21 and 22 may be determined by selecting a value of the alternating pitch s. In other words, the strips of regions 22 may be further apart or closer together in the zone 20. The value of the pitch s is then determined by the widths of the strips of regions 21. In particular, the strips of the regions 22 may all have the same widths along the radial directions.

According to a second method, the strips of the regions 21 and 22 may be distributed with an alternating pitch s which is initially fixed along the radial directions in the peripheral zone 20. The proportion between the regions 21 and 22 may then be determined by selecting a value of the period ratio of the strips of the regions 21 and 22 in the zone 20. In particular, the alternating pitch may be constant in the peripheral zone 20. The lens shown in FIGS. 1a and 1b on the one hand, and the lens 1' shown in FIGS. 2a and 2b on the other, differ from each other by such an adjustment in the proportion of the regions 22 in the peripheral zone 20. The lens 1 (FIGS. 1a and 1b) corresponds to the zero value of the gain G whereas the lens 1' (FIGS. 2a and 2b) corresponds to the unity value of the gain G.

The proportion of the regions 22 within the peripheral zone 20 may also be locally adjusted and vary between different points in the zone 20. Such a local value of the proportion is denoted by $Q_{local}$. It is determined from a small portion of the zone 20 around a point of concern, while still containing a few portions of regions 21 and a few portions of regions 22. The local proportion $Q_{local}$ may be determined in the same ways as for the overall proportion $Q_{mean}$, by considering local values for the alternating pitch s and for the period ratio of the regions 21 and 22.

In this case, the local proportion $Q_{local}$ of the regions 22 in the peripheral zone 20 is preferably an increasing function of the eccentricity E of a light ray on the eyeglass. In other words, the second regions 22 occupy an increasing proportion of the peripheral zone 20 for increasing radial distances on the eyeglass from the centre of the zone 10.

Figure 7:
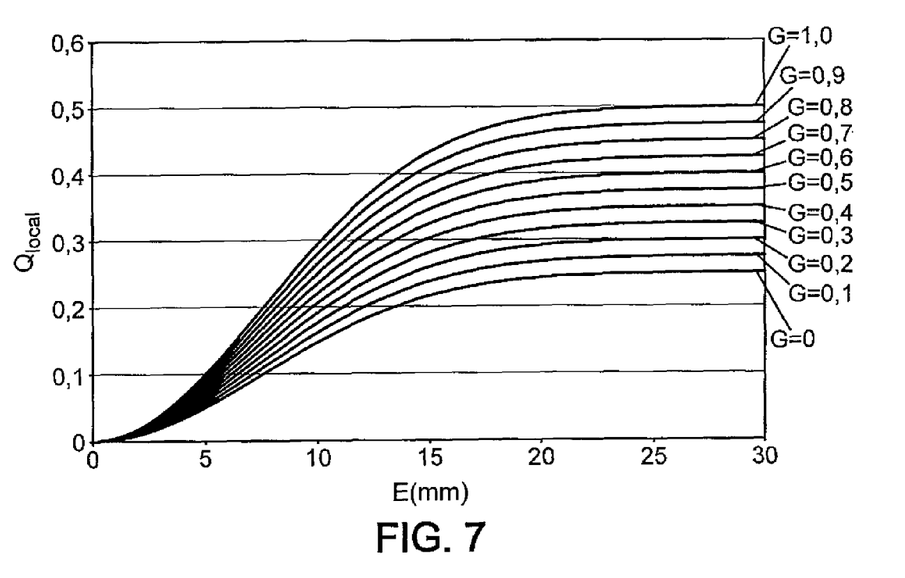
FIG. 7 is a plot showing variations in a local proportion of regions dedicated to the correction of peripheral vision for a series of eyeglasses according to the invention.

The plot in FIG. 7 shows such variations in the local proportion $Q_{local}$ of the regions 22 in the zone 20 for several possible values of the gain G. The local proportion values $Q_{local}$ are plotted on the y-axis and the eccentricity values E of a light ray are plotted on the x-axis. For a fixed value of the eccentricity E, the local proportion $Q_{local}$ is also an increasing function of the gain G in a way which is consistent with variations in the overall proportion $Q_{average}$ as shown in FIG. 6.

A finished eyeglass in accordance with the invention may be produced from a semi-finished eyeglass in which either the anterior face S1 or the posterior face S2 determines the central zone 10 and the peripheral zone 20 divided into regions 21 and 22 as described above. When the other face is machined into a spherical or toric shape, the semi-finished eyeglass sets the difference between the ophthalmic corrections that will be produced by the finished eyeglass in the central zone 10 and the regions 21 on the one hand and in at least one of the regions 22 on the other, respectively. In this case, the production of the eyeglass may include the following substeps:

the semi-finished eyeglass is selected; and the other face, either the anterior face S1 or the posterior face S2, of the semi-finished eyeglass is machined so that the finished eyeglass produces the first ophthalmic correction in the zone 10 and in the regions 21.

As indicated above, the semi-finished eyeglass may be selected according to the size of the central zone 10 and/or the proportion between the regions 21 and 22 determined for the wearer. Its definitive face may especially be the anterior face S1.

Table 1 below gives characteristics of three finished eyeglasses according to the invention (in which the symbol δ denotes the dioptre unit):

TABLE 1

|  | Eyeglass 1 | Eyeglass 2 | Eyeglass 3 |
| --- | --- | --- | --- |
| Radius $r_{10}$ of the zone 10 | 2.0 mm | 7.5 mm | 4.75 mm |
| Maximum value of $Q_{local}$ | 0.50 | 0.25 | 0.375 |
| Variation in $Q_{local}$ with E | Constant | Increasing | Constant |
| Optical power $P_1$ | −4.00 δ | −2.00 δ | −6.00 δ |
| Optical power $P_2$ | −3.20 δ | −0.50 δ | variable |
| Difference $|P_2 - P_1|$ | 0.80 δ | 1.50 δ | variable |
| Radial width of the regions 22 | 50 μm | 25 μm | 25 μm |
| Corresponding value of G | 1 | 0 | 0.5 |

Figure 8:
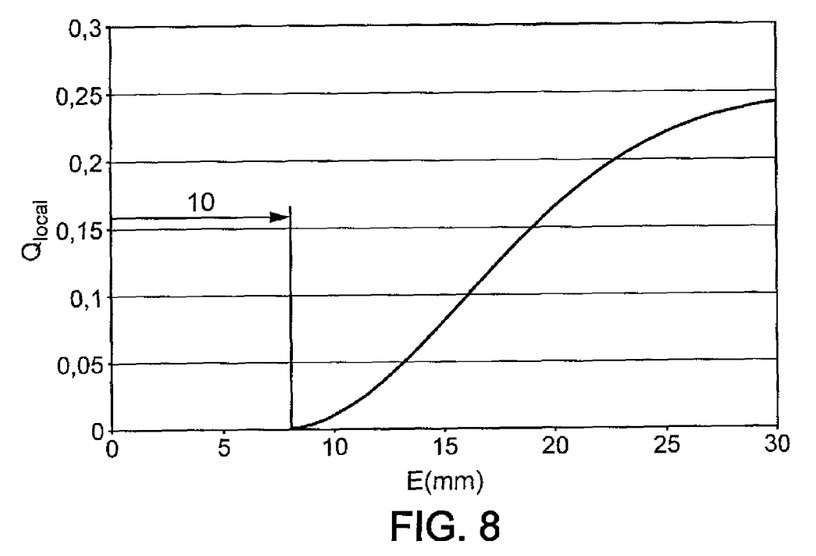
FIG. 8 corresponds to FIG. 7 for a particular example of an eyeglass according to the invention.
Figure 9:
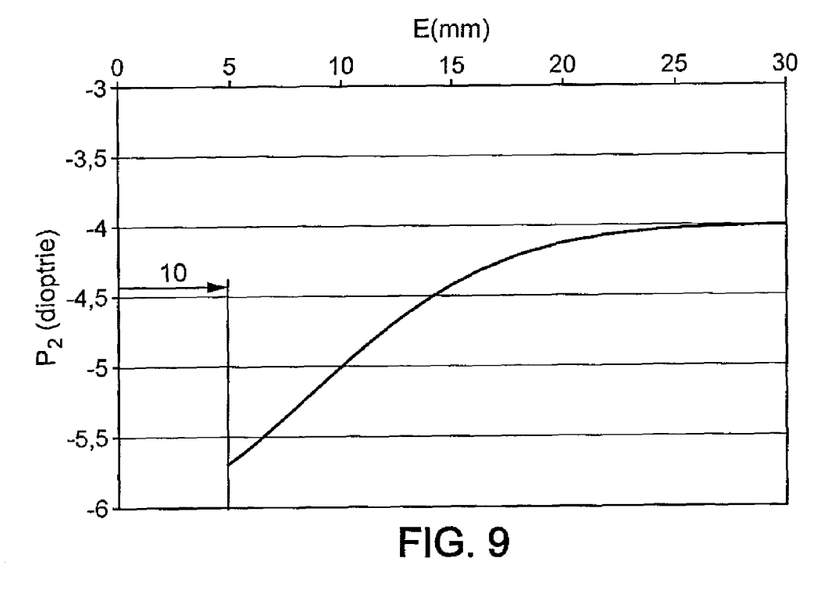
FIG. 9 is a plot showing variations in optical power in the peripheral zone for another particular example of an eyeglass according to the invention.

FIGS. 8 and 9 supplement Table 1 for characteristics of the eyeglasses 2 and 3 that are not constant:

the plot in FIG. 8 shows the variations in the local proportion $Q_{local}$ of the regions 22 in the peripheral zone 20 of the eyeglass 2 as a function of the eccentricity E; and the plot in FIG. 9 shows the variations in the optical power $P_2$ in the regions 22 of the eyeglass 3.

These two plots show the central zone 10 but, because of the small radial dimensions of the regions 22, these regions do not appear in those parts of the curves that correspond to the peripheral zone 20.

In general when the regions 21 and 22 are located on the convex anterior face S1 of the lens and when the spectacle eyeglass which is obtained therefrom produces a myopia correction, the face S1 is more convex in the regions 22 than in the regions 21. Conversely, the face S1 is less convex in the regions 22 than in the regions 21 when the eyeglass produces a hypermetropia correction, the regions 21 and 22 then being located on the face S1 of the lens.

Figure 10A:
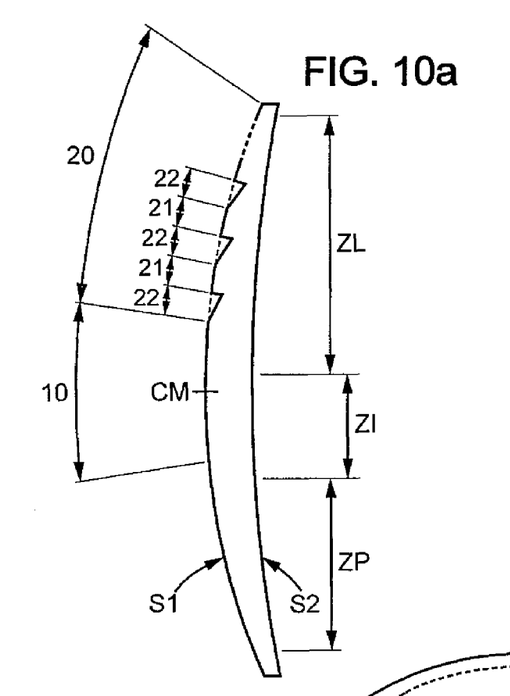
FIGS. 10a and 10b are two views that illustrate an application of the invention to a progressive eyeglass, in cross-section and in plan respectively.
Figure 10B:
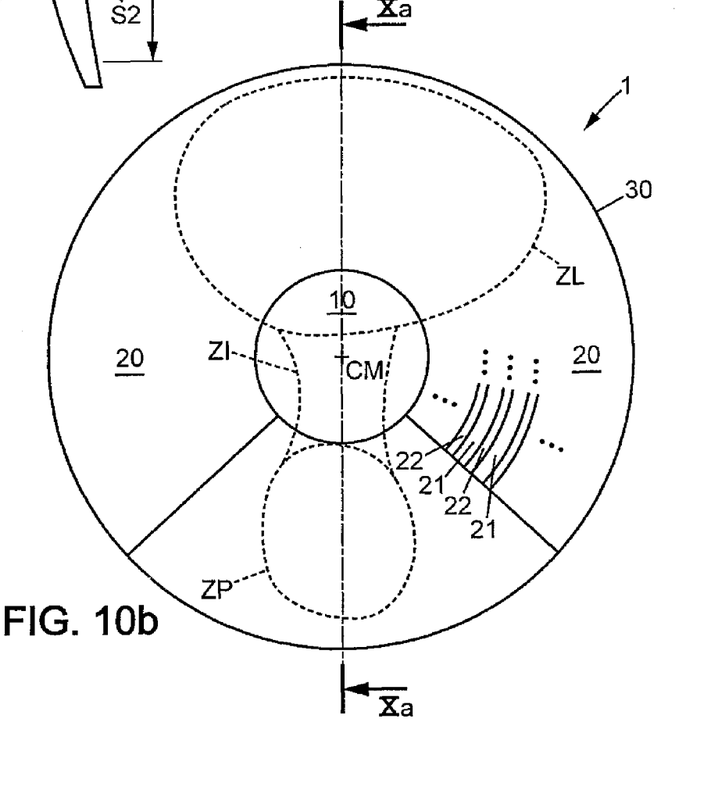

Optionally, that face of the eyeglass other than the one that determines the central zone 10 and the regions 21 and 22 may be machined so as to form, on said face, a continuous surface with a progressive variation in curvature. As shown in FIG. 10a, the face S1 of the eyeglass is again formed so as to determine the central zone 10, the peripheral zone 20 and the regions 21 and 22. The face S2 has a complex shape, the curvature of which varies between a far vision zone of the eyeglass, denoted by $Z_F$ and a near vision zone denoted by $Z_N$. Optionally, the peripheral zone 20 may exclude the near vision zone $Z_N$. In this case, the zone 20 is limited to an upper angular sector of the eyeglass, which is located above and on each side of the central zone 10. FIG. 10b shows such a configuration of the eyeglass. $Z_1$ denotes an intermediate zone between the zones $Z_F$ and $Z_N$, in which the curvature of the face S2 varies. In addition to the advantages of the invention, such a lens has those of a progressive addition lens with a gradual change in optical power.

It will be understood that the invention may be implemented by modifying the numerical values given in the detailed description above, and also the variations indicated by the plots shown in the appended figures. Likewise, the central zone, the peripheral zone, and the first and second regions may have shapes differing from those described.

Furthermore, it should be understood that the central zone, the peripheral zone and the first and second regions may be defined by an intermediate surface of the lens. In this case, the lens may consist of two transparent components that are made of respective materials having different light refractive indices. These two lens components, which have complementary shapes, are bonded together along the intermediate surface.

The invention claimed is:

1. A method of producing an ophthalmic spectacle eyeglass intended for a wearer, the method comprising:
   obtaining a first ophthalmic correction for the wearer's foveal vision and a second ophthalmic correction for at least one eccentricity value belonging to the wearer's peripheral vision, said first and second corrections being different;
   determining a central zone and a peripheral zone of the eyeglass, the peripheral zone being located between the central zone and at least one portion of a peripheral edge of said eyeglass;
   dividing the peripheral zone a plurality of first and second regions that are contiguous and alternate with a pitch of 2 mm or less;
   determining first parameters of the eyeglass in the central zone and in the first regions, corresponding to the first ophthalmic correction, and determining second parameters of said eyeglass in the second regions according to the second ophthalmic correction; and
   producing the eyeglass in accordance with said first and second parameters.

2. The method according to claim 1, wherein the central zone and the first and second regions are determined by variations in at least one parameter of one and the same surface of the ophthalmic eyeglass.

3. The method according to claim 1, wherein the determining the central zone comprises:
   characterizing an amplitude of head movement by the wearer, performed when said wearer looks in succession at objects located in different directions; and
   determining a size of the central zone of the eyeglass so that said size of the central zone decreases as a function of the head movement amplitude characterized for the wearer.

4. The method according to claim 1, wherein the central zone of the eyeglass, in which the parameters of said eyeglass correspond to the first ophthalmic correction, is contained in a disc of 7.5 mm radius.

5. The method according to claim 1, wherein the central zone of the eyeglass, in which the parameters of said eyeglass correspond to the first ophthalmic correction, contains a disc of 2 mm radius.

6. The method according to claim 1, wherein a proportion between the first and second regions in the peripheral zone of the eyeglass is determined as a function of an amplitude of head movement performed by the wearer when said wearer looks in succession at objects located in different directions so that a quotient of a sum of areas of second regions divided by an area of a corresponding portion of the peripheral zone increases as a function of the amplitude of head movement performed by the wearer.

7. The method according to claim 1, wherein the first and second regions are strips arranged in an angular sector around the central zone of the eyeglass and alternating along radial directions extending from said central zone to the peripheral edge of the eyeglass.

8. The method according to claim 6, wherein the strips of the second regions have respective widths fixed along the radial directions in the peripheral zone of the eyeglass and wherein the proportion between the first and the second regions in the said peripheral zone is determined by selecting at least one value of the alternating pitch of the strips of the first and second regions.

9. The method according to claim 6, wherein the strips of the first and second regions alternate with a fixed value of the pitch along the radial directions in the peripheral zone of the eyeglass, and wherein the proportion between the first and second regions in said peripheral zone is determined by selecting at least one value of a period ratio of the strips of the first and second regions.

10. The method according to claim 1, wherein the second regions each have at least one dimension lying between 15 μm and 1000 μm.

11. The method according to claim 1, wherein the eyeglass produces a first optical power in the central zone and the first regions corresponding to a hypermetropia correction for the foveal vision of the wearer and produces a second optical power within one of the second regions for the peripheral vision of said wearer, said second optical power being lower in algebraic value than said first optical power.

12. The method according to claim 11, wherein the second correction corresponds to a hypermetropia subcorrection for the peripheral vision of said wearer.

13. The method according to claim 11, wherein the second parameters of the eyeglass are adapted in order for the second optical power to be constant or decreasing in algebraic value as a function of a radial distance, measured on said eyeglass from a reference point of the central zone, from one second region to another and optionally within each second region.

14. The method according to claim 1, wherein the eyeglass produces a first optical power in the central zone and the first regions corresponding to a myopia correction for the foveal vision of the wearer and produces a second optical power within one of the second regions for the peripheral vision of the wearer, said second optical power being higher in algebraic value than said first optical power.

15. The method according to claim 14, wherein the second correction corresponds to a myopia subcorrection for the peripheral vision of said wearer.

16. The method according to claim 14, wherein the second parameters of the eyeglass are adapted so that the second optical power is constant or increasing in algebraic value as a function of a radial distance, measured on said eyeglass from a reference point of the central zone, from one second region to another and optionally within each second region.

17. The method according to claim 3, wherein the amplitude of the head movement performed by the wearer is characterized by:
measuring an angle of head rotation by the wearer, when said wearer looks in succession at two objects located in angularly separated directions; and
determining a value of a gain from a quotient between the measured angle of rotation of the wearer's head on the one hand and an angular distance between the two objects on the other, said gain varying as an increasing function or as a decreasing function of said quotient.

18. The method according to claim 1, wherein the producing the eyeglass comprises:
selecting a semi-finished eyeglass, one surface of which, either the anterior surface or the posterior surface of said semi-finished eyeglass, determines a central zone, a peripheral zone located between said central zone and at least one portion of a peripheral edge of said semi-finished eyeglass, and first and second regions that are contiguous and alternate with a pitch of 2 mm or less, and forming a partition of the peripheral zone of the semi-finished eyeglass fixing a difference between ophthalmic corrections produced respectively in the central zone and the first regions on the one hand and in at least one of the second regions on the other, for a finished eyeglass produced from said semi-finished eyeglass; and
machining the other surface of the semi-finished eyeglass, either the posterior surface or the anterior surface, so that the eyeglass produces the first ophthalmic correction in the central zone and in the first regions.

19. The method according to claim 18, wherein the determining the central zone comprises:
characterizing an amplitude of head movement by the wearer, performed when said wearer looks in succession at objects located in different directions; and
determining a size of the central zone of the eyeglass so that said size of the central zone decreases as a function of the head movement amplitude characterized for the wearer; and
wherein the semi-finished eyeglass is selected as a function of at least one of the size of the central zone and the proportion between the first and the second regions which is determined for the wearer.

20. The method according to claim 18, wherein the surface of the eyeglass other than that which determines said central zone and said first and second regions is machined to form on said other surface a continuous area having a progressive variation in curvature.

21. The method according to claim 10, wherein the second regions each have at least one dimension lying between 25 μm and 50 μm.

22. A lens for ophthalmic spectacles, comprising:
a central zone;
a peripheral zone located between said central zone and at least one portion of a peripheral edge of the lens; and
first and second regions forming a partition of the peripheral zone, which are contiguous and alternate with a pitch of less than 2 mm, the lens being adapted so that a spectacle eyeglass obtained from said lens produces a first ophthalmic correction, for a foveal vision in the central zone and in the first regions, and produces a second ophthalmic correction, for a peripheral vision in the second regions which is different from said first ophthalmic correction.

23. The lens according to claim 22, forming a semi-finished or finished eyeglass.

24. The lens according to claim 22, wherein the central zone and the first and second regions are determined by variations in a parameter of one and the same surface of the lens.

25. The lens according to claim 22, wherein the central zone of the lens is contained in a disc of 7.5 mm radius.

26. The lens according to claim 22, where the central zone of the lens contains a disc of 2 mm radius.

27. The lens according to claim 22, wherein the first and second regions are strips lying in an angular sector around the central zone and alternating along radial directions extending from said central zone to the peripheral edge of the lens.

28. The lens according to claim 27, wherein the strips of the second regions have identical respective widths along the radial directions in the peripheral zone of the lens.

29. The lens according to claim 27, wherein the alternation pitch of the strips of the first and second regions along the radial directions is constant in the peripheral zone of the lens.

30. The lens according to claim 22, wherein the second regions each have at least one dimension ranging between 15 μm and 1000 μm.

31. The lens according to claim 22, adapted so that the spectacle eyeglass obtained from said lens produces a first positive optical power, for the foveal vision of a wearer of said eyeglass, in the central zone and the first regions and produces a second optical power, for the peripheral vision of said wearer, in any one of the second regions, said second optical power being lower in algebraic value than said first optical power.

32. The lens according to claim 31, adapted so that the second optical power produced by the spectacle eyeglass is constant or decreases in algebraic value as a function of a radial distance, measured on said eyeglass from a reference point of the central zone, from one second region to another and optionally within each second region.

33. The lens according to claim 31, wherein the first and second regions are located on a convex face of the lens, said face being less convex in the second regions than in the first regions.

34. The lens according to claim 22, adapted so that the spectacle eyeglass obtained from said lens produces a first negative optical power, for the foveal vision of a wearer of said eyeglass, in the central zone and the first regions and produces a second optical power, for the peripheral vision of said wearer, in any one of the second regions, said second optical power being higher in algebraic value than said first optical power.

35. The lens according to claim 34, adapted so that the second optical power produced by the spectacle eyeglass is constant or increasing in algebraic value as a function of a radial distance, measured on said eyeglass from a reference point of the central zone, from one second region to another and optionally within each second region.

36. The lens according to claim 34, wherein the first and second regions are located on a convex face of the lens, said face being more convex in the second regions than in the first regions.

37. The lens according to claim 22, comprising two opposed faces separated by a refringent medium, a first face of the two faces determining the central zone and the first and second regions, and a second face of the two faces having a continuous surface with a progressive variation in curvature.

38. The lens according to claim 30, wherein the second regions each have at least one dimension ranging between 25 μm and 50 μm.

* * * * *